United States Patent [19]
Messmer

[11] Patent Number: 5,842,438
[45] Date of Patent: Dec. 1, 1998

[54] AUTOMATICALLY VENTILATED FELINE LITTER BOX

[75] Inventor: Dale Messmer, Maumelle, Ark.

[73] Assignee: Kitty Kan, Inc., Little Rock, Ark.

[21] Appl. No.: 766,334

[22] Filed: Dec. 16, 1996

[51] Int. Cl.⁶ .................................................. A01K 1/035
[52] U.S. Cl. ......................................... 119/165; 119/484
[58] Field of Search ................................... 119/165, 484, 119/622, 500

[56] References Cited

U.S. PATENT DOCUMENTS

| | | | |
|---|---|---|---|
| 2,932,279 | 7/1960 | Giles | 119/165 |
| 2,963,003 | 10/1960 | Oberg et al. | 119/165 |
| 3,141,441 | 7/1964 | Russell | 119/165 |
| 3,885,523 | 5/1975 | Coleman | 119/165 |
| 4,021,975 | 5/1977 | Calkins | 52/64 |
| 4,291,645 | 9/1981 | Cruchelow et al. | 119/484 |
| 4,445,459 | 5/1984 | Julie | 119/28.5 |
| 4,696,257 | 9/1987 | Neary et al. | 119/166 |
| 4,788,934 | 12/1988 | Fetter | 119/484 |
| 4,938,169 | 7/1990 | Barmakian | 119/484 X |
| 4,989,546 | 2/1991 | Cannaday | 119/484 |
| 5,092,270 | 3/1992 | Simons et al. | 119/453 |
| 5,148,767 | 9/1992 | Torchio | 119/484 |
| 5,165,366 | 11/1992 | Harvey | 119/165 |
| 5,195,457 | 3/1993 | Namanny | 119/165 |
| 5,337,697 | 8/1994 | Trimarchi et al. | 119/484 |
| 5,361,725 | 11/1994 | Baillie et al. | 119/165 |
| 5,388,550 | 2/1995 | Noble | 119/165 |
| 5,458,088 | 10/1995 | Owens | 119/622 |
| 5,522,344 | 6/1996 | Demurjian | 119/484 X |
| 5,566,640 | 10/1996 | Krumrei | 119/165 |

FOREIGN PATENT DOCUMENTS 655638  5/1986  Switzerland ........................... 119/622

*Primary Examiner*—Michael J. Carone
*Assistant Examiner*—Elizabeth Shaw
*Attorney, Agent, or Firm*—Stephen D. Carver

[57] ABSTRACT

A cat litter box comprising a generally parallelepiped housing installed in a window opening of a dwelling. An expandable curtain enshrouding the housing permits unit width to be adjusted for different window frames. An internal partition divides the housing interior into a litter box compartment and an adjoining entrance foyer. The compartment holds a conventional litter box. One compartment wall comprises a pivoting shelf that opens for litter box servicing. The foyer permits entry into the housing while a port penetrating the partition permits movement between the foyer and the compartment. A capture system in the foyer recovers unused litter and other debris as a cat moves over it. The capture system comprises a storage tray with a perforated lid. The recovered litter may be transferred from the tray to the litter box during servicing. A distraction window increases a cat's residence time in the foyer. An optional grooming disk in the port removes loose hair from a cat when it moves between the foyer and the compartment. Preferably, an automatic ventilation orifice is located near the top corner of an exterior housing wall in the compartment. The orifice is covered by an exterior shield and an inner flap that prevents debris from entering the housing. The flap is normally closed, but when a door shuts in the dwelling the flap is forced open by the resultant pressure differential. The pressure differential also forces air to flow from the compartment to the housing exterior.

10 Claims, 9 Drawing Sheets

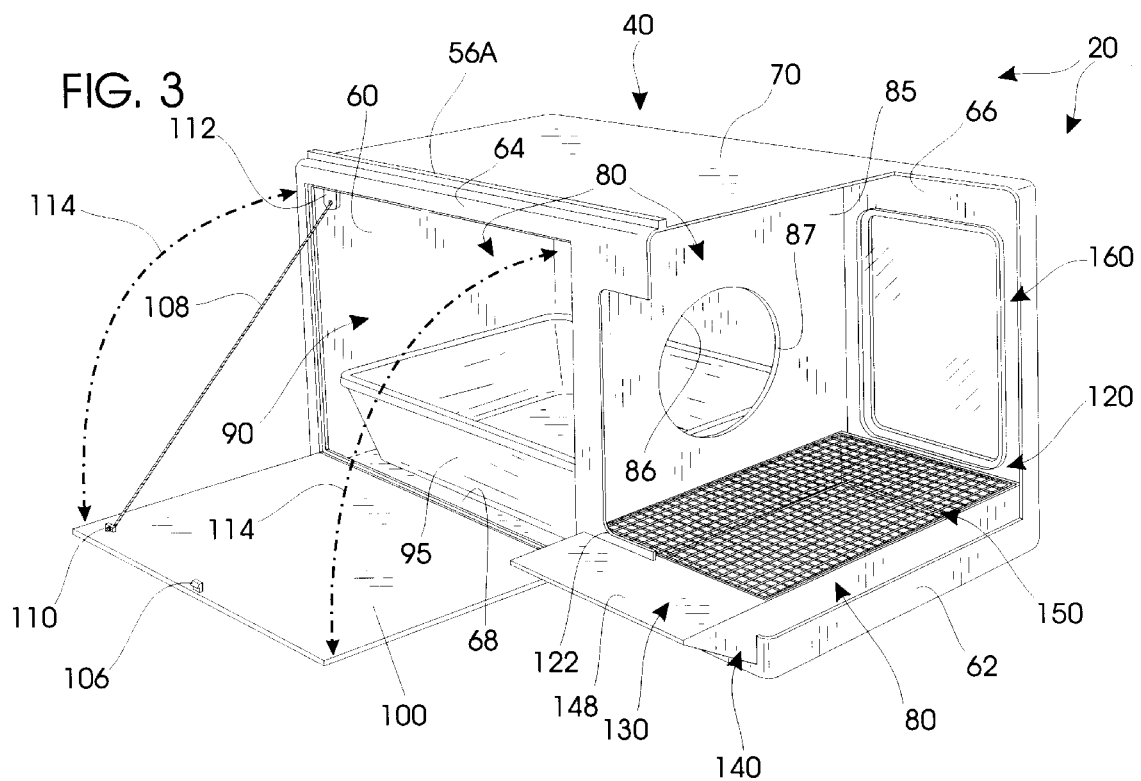

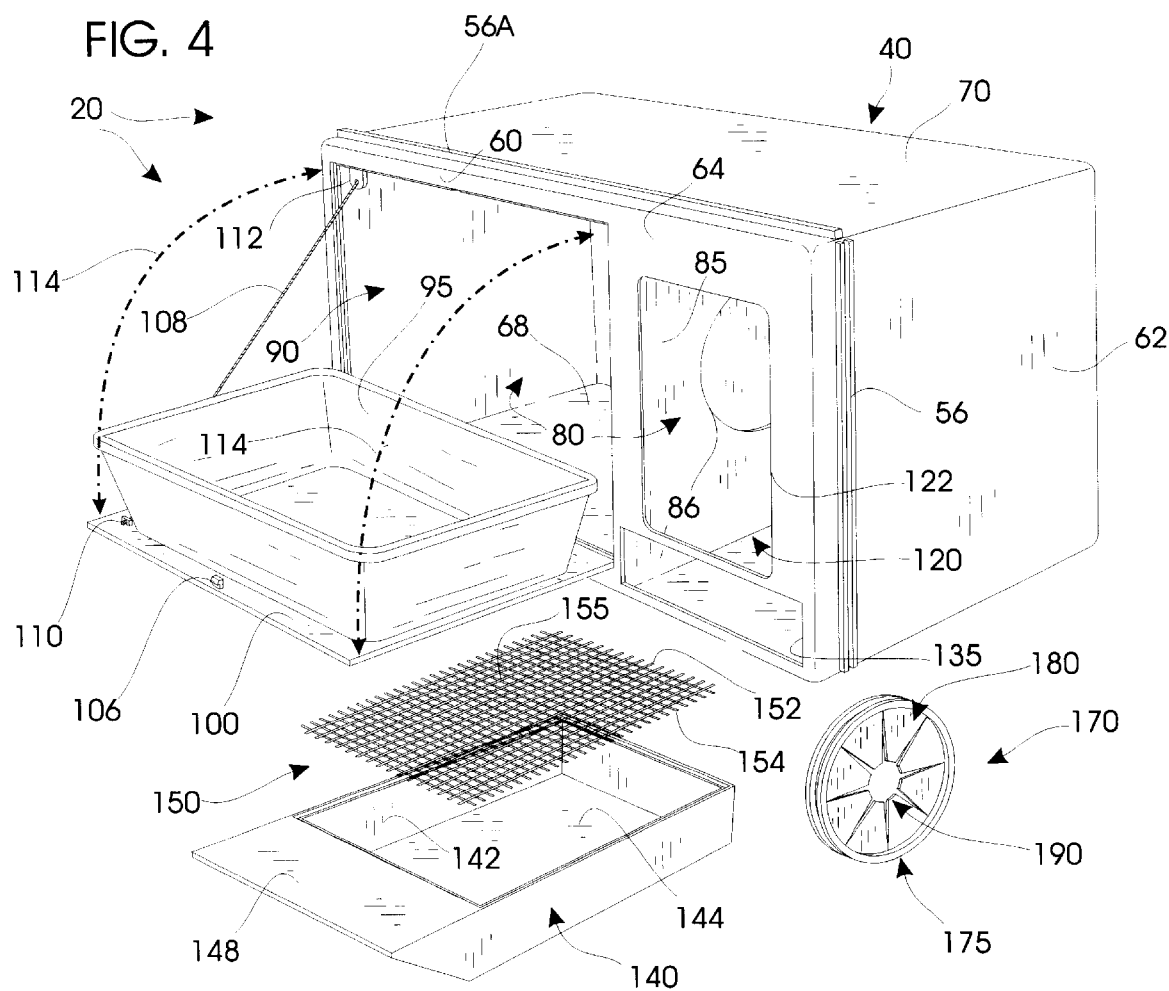

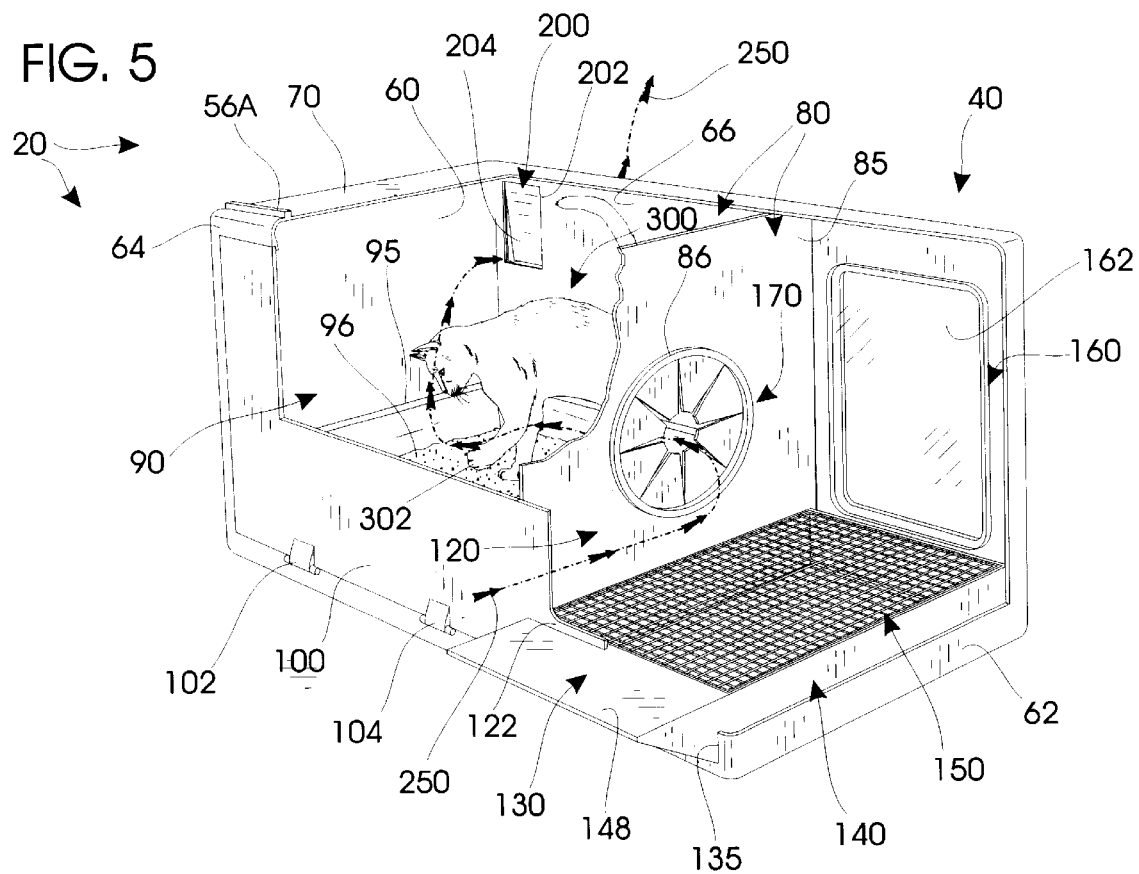

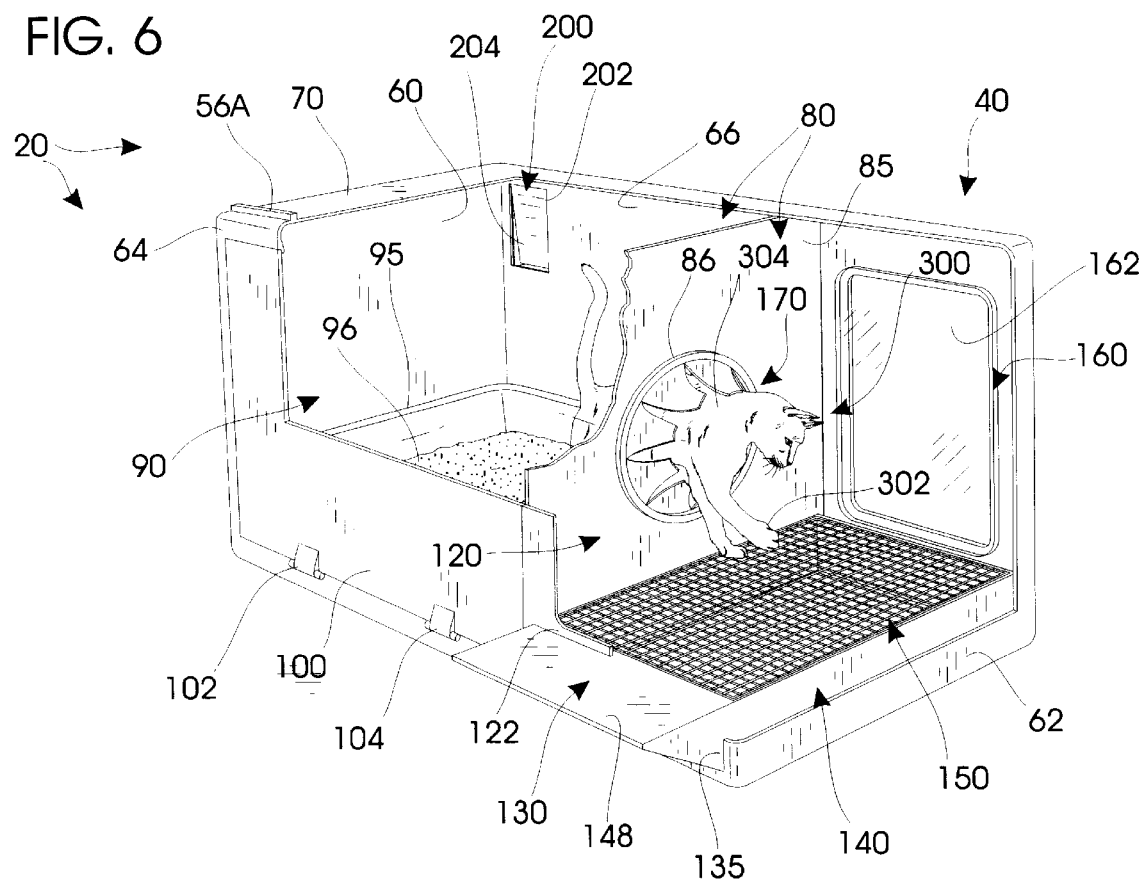

AUTOMATICALLY VENTILATED FELINE LITTER BOX

BACKGROUND OF THE INVENTION

I. Field of the Invention

The present invention relates generally to ventilated litter boxes for felines, especially cats kept indoors as pets. More specifically, the present invention relates to a window mounted litter unit for indoor cats that is exteriorly ventilated automatically whenever a door in the house is shut. Known relevant prior art may be found in U.S. class 419, subclasses 19 and 165.

II. Description of the Prior Art

As will be immediately appreciated by many pet owners, cats make excellent indoor companions. One reason cats make ideal indoor pets is because they are exceptionally sanitary creatures. For example, cats instinctively prefer to use a "litter box" (an open box commonly filled with an absorbent material such as sand or clay, as shown in U.S. Pat. Nos. 2,963,003 and 3,141,441) for excretions. Unfortunately, cats often scratch or paw the litter and trapped excrement.

Such scratching or pawing usually results in "scattered" litter and excrement about the litter box. Many solutions have been proposed to overcome the scattering problem. A common solution employed by many pet owners is putting a cover on the litter box (i.e., U.S. Pat. Nos. 3,885,523 and 5,092,270) or simply putting the box itself in a restricted area, such as a closet in the bathroom.

However, odor is still a problem even if the cats do not scatter the litter. While it is true that most conventional litters absorb feline excrement well, they simply do not perform an acceptable deodorizing job, particularly over an extended time period. In other words, even neat litter boxes stink. The consequent stench is undesirable. Furthermore, enclosing the litter box often compounds the stench problem because of the decreased air flow around the litter. Thus, placing the litter box in a restricted area is not usually a satisfactory solution.

Of course, a simple solution to the indoor stench is to have the pet excrete outdoors. Many devices are commercially available that permit pet access to the house exterior (i.e., "doggy doors," etc.). But many pet owners do not want their pets outside during inclement weather or for security reasons. Further, some pets simply will not go outside during harsh conditions. Thus, simply putting the pet outside to excrete is often not a satisfactory solution.

There are several proposed, improved litter boxes that are designed to at least partially overcome the problems discussed above. One interesting solution is shown in U.S. Pat. No. 4,696,257. A self-drying litter box that uses an electric fan is shown. One problem with such a device is that the fan uses electricity, which costs the pet owner money.

Additional proposed devices are shown in U.S. Pat. Nos. 5,165,366, 4,021,975, 5,195,457 and 2,932,279. These devices generally provide an enclosure that extends from the interior of the house to the exterior. The first three devices also provide a litter box section that is passively ventilated.

The passive ventilation systems shown in the above patents are undesirable for several reasons. First, the system shown in both 4,021,975 and 5,195,457 comprise a simple wire mesh screen. The screen is always open, permitting the entry of dust, debris, drafts, insects, etc. The system shown in 5,165,366 comprises slots in the bottom of the litter box. Such slots do not provide a large air flow and they can easily become clogged or otherwise disabled. Thus, the ventilation systems shown in these patents fail to perform adequately.

U.S. Pat. Nos. 5,337,697, 4,445,459, 4,989,546, 4,788,934, 4,291,645 and 5,148,767 show pet enclosures attached to the exterior of a house. These devices generally provide a passageway for the pet between the enclosure and the house. However, these devices do not provide a method of handling pet excrement.

Therefore, the known prior art fails to adequately deal with both litter scattering and ventilation. An ideal, improved litter box would combine an efficient litter enclosure with an adequate ventilation system to substantially reduce litter scattering as well as litter odor.

An ideal litter box housing would automatically ventilate the litter box enclosure to reduce odors. An expanding frame that increased the ease of installing the housing in a conventional window would also be a welcome improvement.

Furthermore, of the known prior art, only U.S. Pat. Nos. 3,885,523, 5,165,366 and 5,195,457 make provisions for removing litter from the cat's paws before it leaves the litter box. The first device returns the recovered litter into a sheltered portion of the litter box. The other two devices discharge the recovered litter outside of the box, presumably on the ground outside the house. However, it is expected that this recovered litter generally has not yet been soiled. In other words, since cats typically will not step on their excretions, the captured litter has not yet been defecated or urinated upon. Thus, the unused, recovered litter has not yet been used by the cat in the known prior art devices and it is consequently being wasted.

A capture system that stores and holds unused, recovered litter would decrease the lost litter that cats normally track out of conventional litter boxes. The recovered litter could then be placed in the litter box and used by the cat, saving the owner unnecessary expenses for additional litter. A further advantage is that litter would not be tracked around the floor in the proximity of the litter box.

SUMMARY OF THE INVENTION

My automatically ventilated feline litter box overcomes several of the perceived problems associated with the known prior art. The improved litter box comprises a generally parallelepiped housing that is installed in a window opening in a dwelling. Preferably, the housing is installed in a house although it may be installed in mobile homes, recreational vehicles, etc. The housing is secured in the window opening by wedging it between the window and the window sill.

An expandable curtain enshrouds the housing exterior. The curtain accommodates installation in various window frame widths. The curtain may be easily expanded as necessary during installation.

The box-like housing comprises two spaced apart, parallel exterior walls and an interior wall spaced apart from a parallel exterior wall. The walls extend between a floor and a spaced apart roof. The walls, floor and roof jointly define an interior. An internal partition divides the housing interior into a litter box compartment and an entrance foyer.

When used, the litter box compartment holds a conventional litter box filled with litter. In the preferred embodiment, one compartment wall pivots to form a horizontal shelf during litter box servicing. Thus, when the litter needs to be changed, the owner simply unlatches the wall and pivots it into the horizontal shelf configuration. Then, the owner can slide the litter box onto the shelf for convenient access. In this manner the user does not have to work with the litter box at floor level, making maintenance access much easier than with other designs.

The entrance foyer provides a passageway into the housing interior. A port penetrates the partition to enable a cat to move between the litter box compartment and the entrance foyer. The entrance foyer employs a unique capture system to recover unused litter from the cat's paws. The system comprises a storage tray with an upper, perforated lid. The lid perforations pry litter and other debris from the cat's paws. The recovered litter is stored in the lower tray until litter box servicing. Then, the recovered litter is transferred from the storage tray to the litter box.

A distraction window increases a cat's residence time in the foyer by attracting the cat's attention while in the foyer. Given the feline reputation for curiosity, it is anticipated that most cats will spend considerable time in the foyer gazing through the window at the outside environment. Various feline toys or other devices may also be placed in the foyer to increase the cat's residence time. Increased residence times increase the efficiency of the capture system. The window also permits natural light to enter the housing so that the pet owner can visually inspect the housing as necessary.

An optional grooming disk in the port removes loose hair from a cat when it moves between the foyer and the compartment. Preferably, the disk comprises a snap-fit outer ring-shaped frame that simply snaps onto the port. Thus, the owner can easily remove the grooming disk when necessary for cleaning. The grooming disk also serves to prevent the return flow of fouled air into the home by closing itself after the cat has entered or exited the litter box area.

Preferably, an automatic ventilation orifice is located near the top corner of one of the exterior walls of the litter box compartment. The orifice is covered by an exterior shield and an associated inner flap that cooperatively prevents debris from entering the housing. The inner flap is normally biased into a closed position. A recessed lip in the orifice prevents the flap from opening inwardly into the housing interior. In other words, the flap only opens one way—outwardly. Thus, the ventilation orifice will not permit air to flow into the litter box compartment from the housing exterior.

Whenever a door shuts in the house, the flap is forced open by the resultant pressure differential. The pressure differential also automatically forces air from the litter box compartment to the house exterior. Thus, the litter box is automatically ventilated whenever a door is closed in the house. As a consequence, odors neither accumulate in the litter box nor flow into the dwelling.

Thus, a primary object of the present invention is to provide an automatically ventilated litter box that prevents the accumulation of odors.

A related basic object of the present invention is to provide a litter box that prevents odors from infiltrating the house interior.

A related object of the present invention is to provide a ventilation system that automatically forces air and odors from the interior of the dwelling in which the device is deployed exteriorly.

Yet another related object of the present invention is to provide a ventilation system that operates automatically whenever a door is closed.

A related object is to provide a vent that is normally closed in order to save heating and cooling energy and prevent debris entry into the house.

Another basic object of the present invention is to provide a housing that prevents the cat from scattering litter.

A related object of the present invention is to provide an entrance that removes litter from the cat's paws as it leaves the housing.

Yet another related object of the present invention is to provide a recapture system that captures unused litter and stores it for subsequent use.

Another basic object of the present invention is to provide a litter box housing that may be easily installed in a conventional window.

Another basic object of the present invention is to provide a litter box wherein the litter may be easily changed.

Yet another object is to provide a distraction that increases the time a cat spends in the housing.

A related object of the present invention is to provide a distraction that increases the efficiency of the capture system.

Yet another basic object is to provide an efficient feline grooming disk that automatically grooms a cat whenever it uses its litter box.

A related object is to provide an easily installable and removable grooming system that contacts the cat in use.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3 is a partially fragmented, front perspective view showing the litter box compartment opened for service;

FIG. 4 is a partially fragmented, exploded front perspective view;

FIG. 5 is a fragmented front perspective view showing the litter box being used by a cat;

FIG. 6 is a fragmented front perspective view showing the cat moving from the litter box compartment to the entrance foyer;

DETAILED DESCRIPTION

Figure 1:
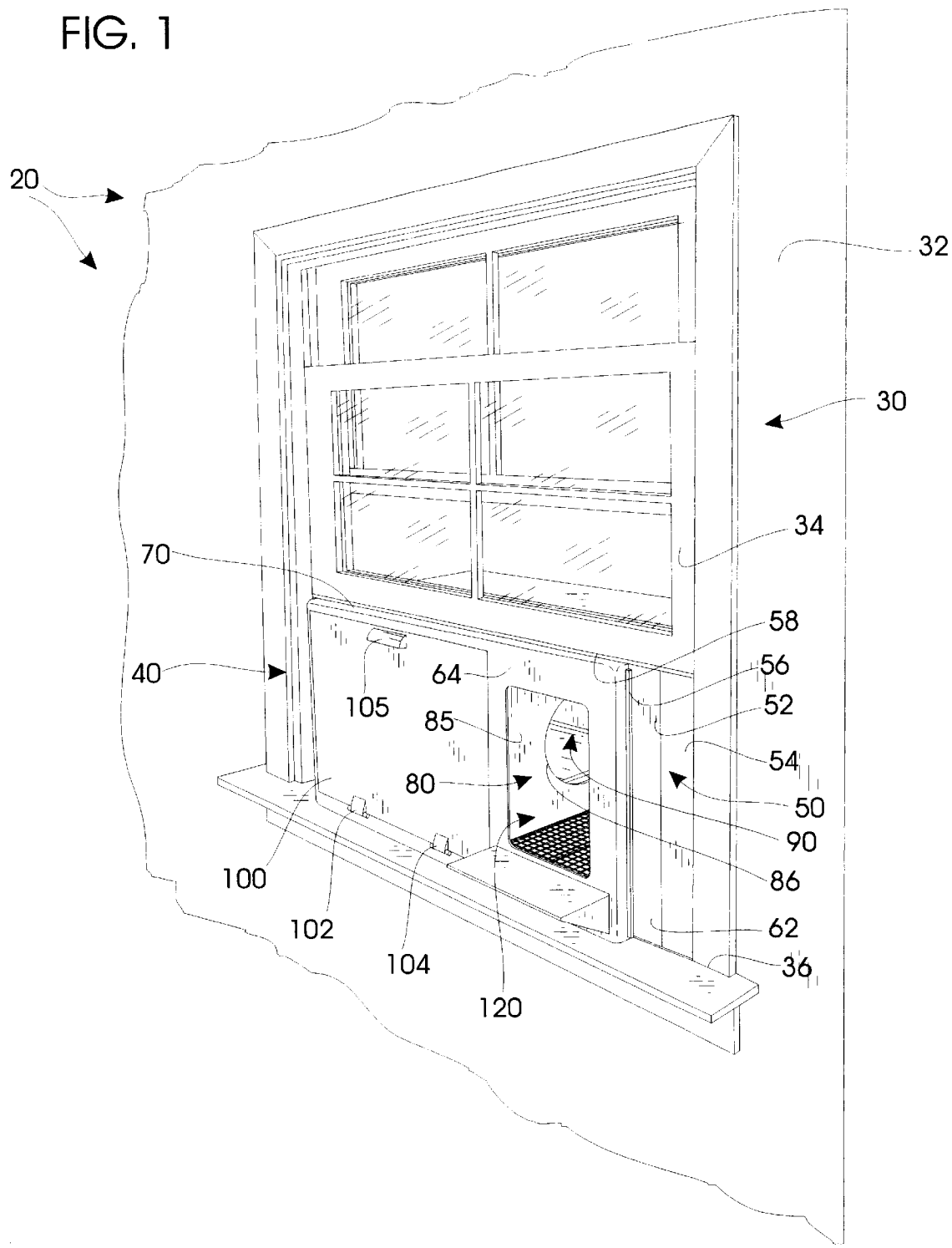
FIG. 1 is a fragmented pictorial view showing ray automatically ventilating litter box installed in a window.

Referring more specifically to the drawings, my automatically ventilated feline litter box is generally designated by the referenced numeral 20 in FIGS. 1–10. Litter box 20 comprises a generally parallelepiped housing 40 that is preferably installed in a window opening 30 of a house 32 or other similar dwelling. In other words, housing 40 may also be installed in a similar window opening in a mobile home, recreational vehicle, etc.

Figure 2:
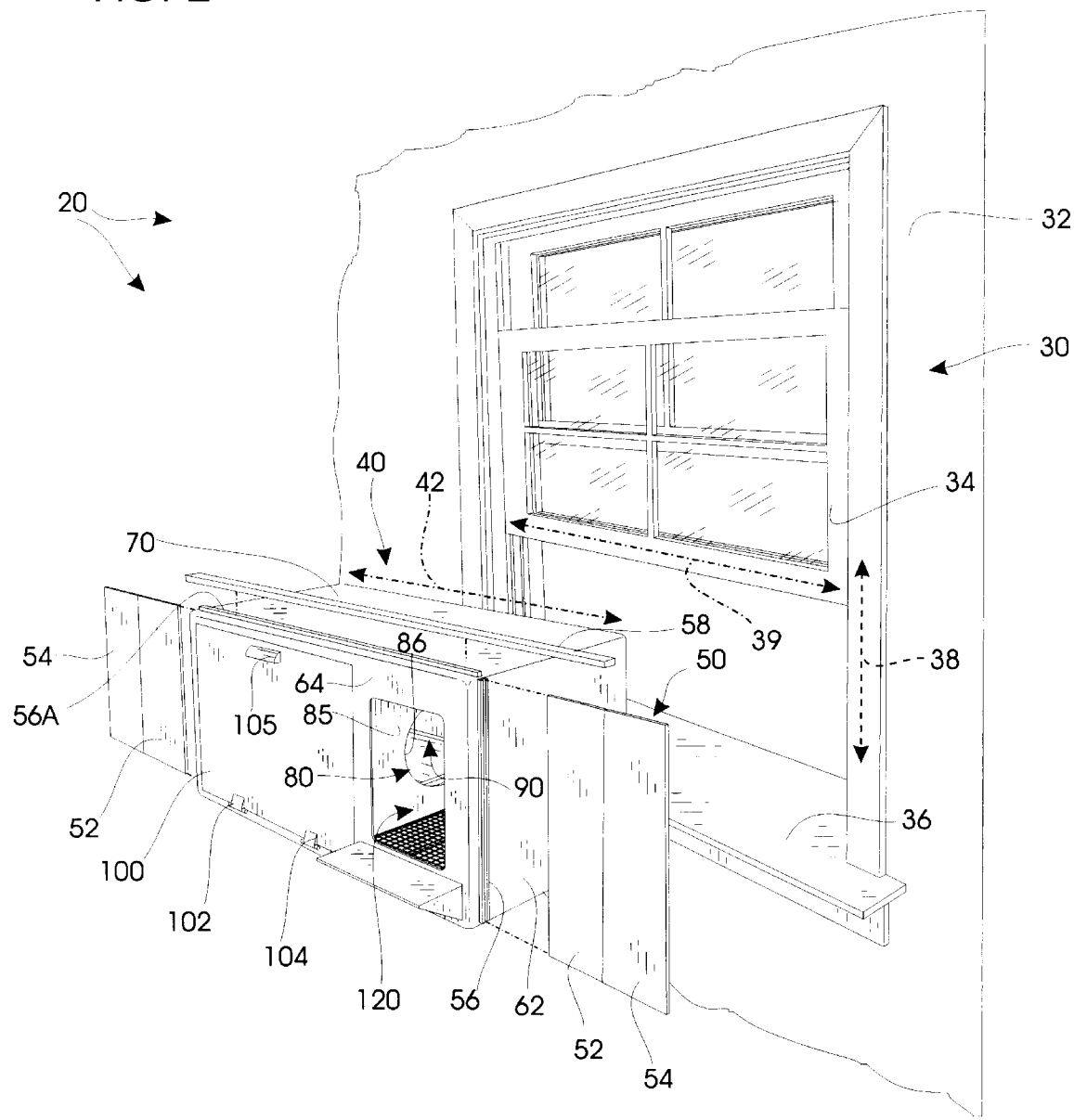
FIG. 2 is a partially exploded, fragmented pictorial view similar to FIG. 1, with the housing removed from the window.

Housing 40 is secured in window opening 30 by wedging it between the lower window 34 and the window sill 36 (FIGS. 1–2). The lower window 34 is first raised upwardly. Then, housing 40 is inserted into opening 30. Finally, window 34 is lowered onto the top of housing 40 to secure it in place (i.e., as generally indicated by arrow 38). A pair of adjustable curtains 50 permit modification of the housing width 42 to fit various window widths 39.

Each curtain 50 comprises an inner panel 52 and an outer panel 54. Preferably, panels 52 and 54 slide relative to one another. Each inner panel 52 locks into flanged slot 56 on the opposite housing side walls 60, 62 (FIG. 2). A similar flange 56A (FIG. 8) on the top can mount an elongated foam insulation strip 58 (FIG. 2) ensures a tight window-to-housing seal.

The box-like housing 40 comprises two parallel, spaced apart exterior side walls 60, 62 and a front interior wall 64 spaced apart from a parallel exterior rear wall 66 (FIG. 3). Walls 60, 62, 64 and 66 extend between a floor 68 and a roof 70. The walls 60, 62, 64 and 66, floor 68 and roof 70 jointly define a hollow interior 80.

An internal partition 85 extending from floor 68 to roof 70 divides interior 80 into a litter box compartment 90 and an entrance foyer 120. A port 86 penetrates partition 85 to permit movement between compartment 90 and foyer 120. Litter box compartment 90 holds a conventional litter box 95 filled with litter 96. Entrance foyer 120 provides an area to recover scattered or tracked litter.

Figure 4A:
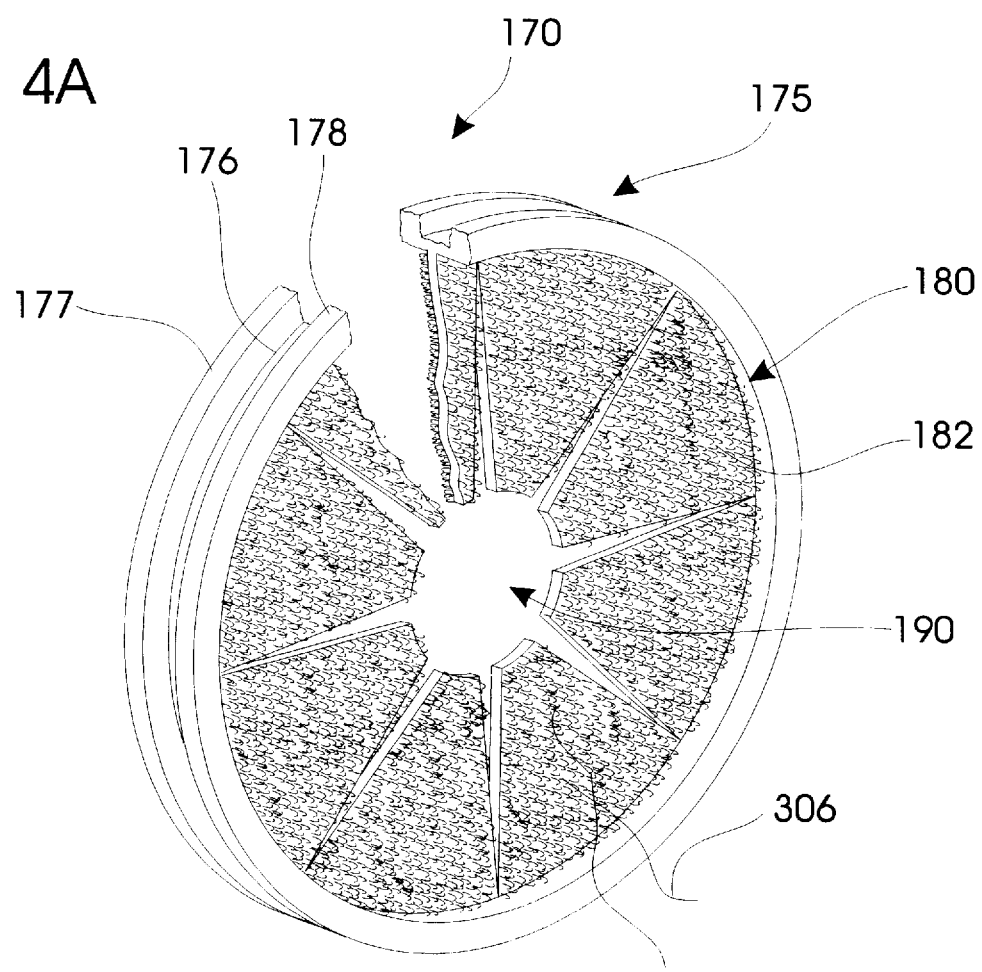
FIG. 4A is a greatly enlarged, perspective view of an optional grooming disk.

Litter box 95 may be easily serviced by accessing compartment 90. Compartment 90 is accessed by pivoting a section of front wall 64 downwardly to move it out of the way. The pivoting section of front wall 64 forms a shelf 100. Shelf 100 pivots via hinges 102, 104. When litter 96 needs to be changed, the owner simply grasps handle 105 and pulls to unlatch detent 106. Shelf 100 pivots about hinges 102, 104 to open litter box compartment 90. A string 108 attaches to shelf 100 via tab 110 and attaches to wall 64 via tab 112. String 108 limits the pivoting motion of shelf 100 to a ninety degree angle. After the shelf 100 pivots through a ninety degree angle from a vertical orientation (as shown in FIGS. 1–2) to a horizontal orientation (as shown in FIG. 3), litter box 95 easily slides onto wall 100 for convenient access. The movement of wall 100 is shown by lines 114 (FIGS. 3–4). Preferably the litter box compartment is at least twelve inches wide and at least eighteen inches long to accommodate conventional litter boxes.

Entrance foyer 120 defines a passageway 122 through front wall 64 and into housing interior 80. Entrance foyer 120 also contains a capture system 130 as well as distraction system 160.

Capture system 130 comprises a storage tray 140 with a perforated top 150. Top 150 fits in a recessed ledge 142 circumscribing the tray storage area 144. An exterior porch 148 gives cat 300 a place to jump upon when entering housing 40. An appropriate slot 135 is also defined in front wall 64 to permit the installation and removal of capture system 130.

Figure 7:
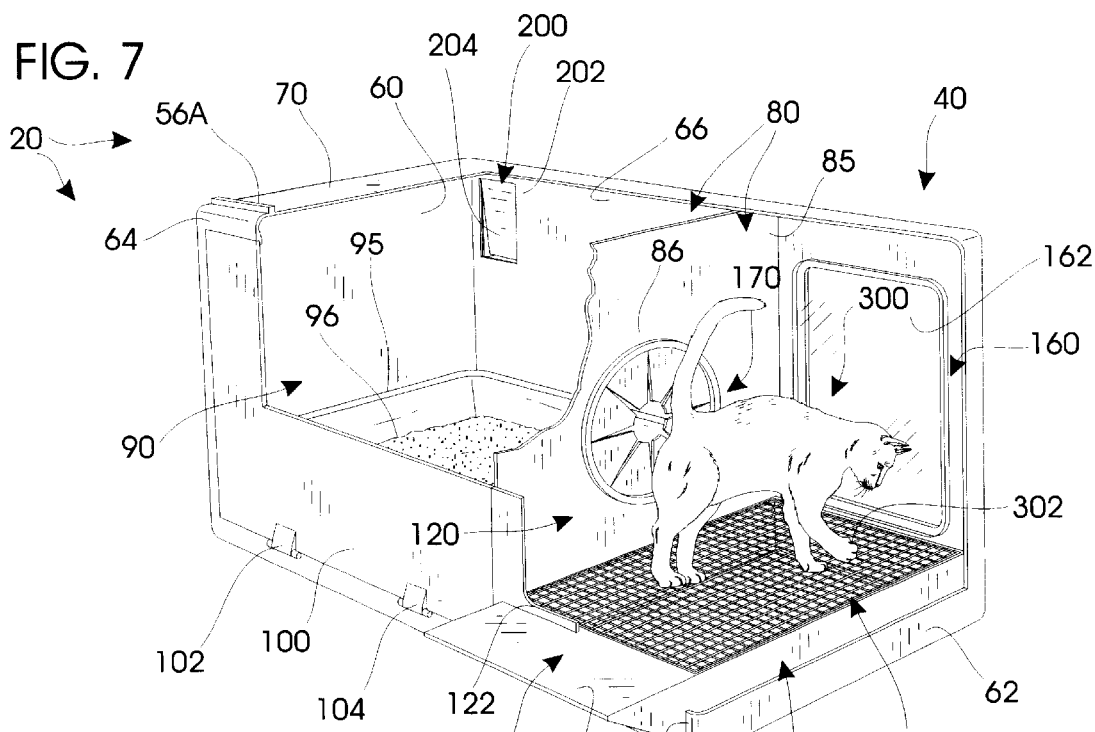
FIG. 7 is a front perspective view showing cat upon the capture system and captivated by the distraction system.

Top 150 comprises a plurality of horizontally oriented, crisscrossed wire stringers 152, 154 that form screen 155. When a cat walks across screen 155, any debris trapped on his paws is removed therefrom (FIG. 7).

A distraction system 160 increases the residence time cat 300 spends upon the capture system 130 in entrance foyer 120. System 160 preferably comprises a transparent plate 162 secured to rear exterior wall 66. Thus, cat 300 can look out plate 162 and gaze upon the exterior of the housing 40. This distraction system 160 should, given the well-known reputation of cats for curiosity, increase the amount of time cat 300 spends upon the capture system 130, especially the paws 302.

An optional grooming disk 170 may be installed in port 86 to conveniently remove loose hair 306 from the cat's coat 304. Grooming disk 170 comprises a ring-shaped, resilient frame 175 from which a plurality of pie-shaped fingers 180 extend.

Frame 175 comprises a channel 176 with a pair of spaced apart retaining walls 177, 178. Frame 175 permits the grooming disk 170 to be easily installed against the port periphery 87. Groove 176 fits snugly against periphery 87 while retaining walls 177, 178 secure the disc 170 thereto.

Each finger 180 is covered with a plurality of raised ribs 182 that stroke fur 304 as cat 300 enters or exits litter box compartment 90. Ribs 182 remove loose hairs 306 as cat 300 passes through disk 170. When full, disk 170 may be easily removed by simply grasping several of the fingers 180 at their central hub 190 and pulling away from the port 85. The disk 170 may be cleaned and then reinstalled by simply snap-fitting it back in place.

Figure 8:
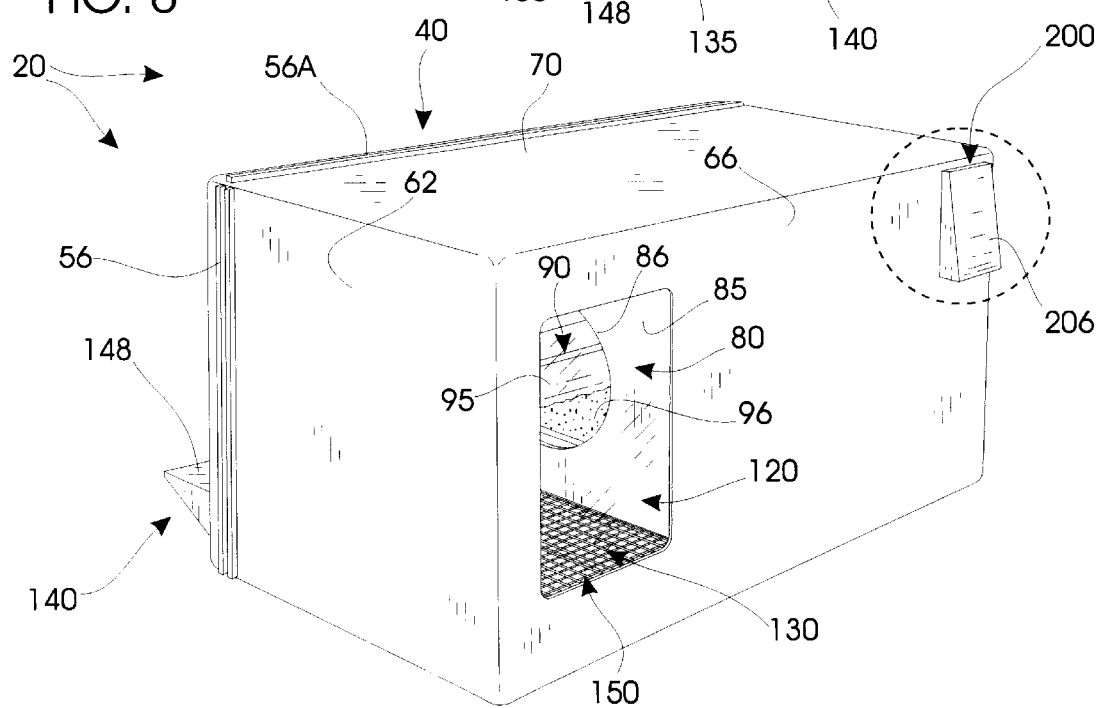
FIG. 8 is a rear perspective view.
Figure 9:
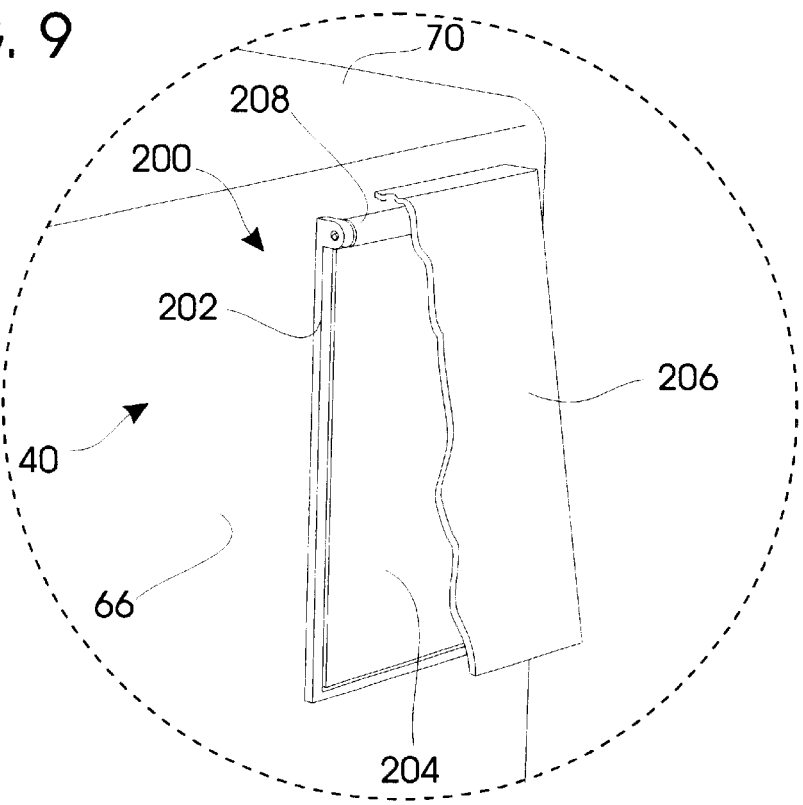
FIG. 9 is an enlarged, fragmented view of the encircled portion of FIG. 8.
Figure 10:
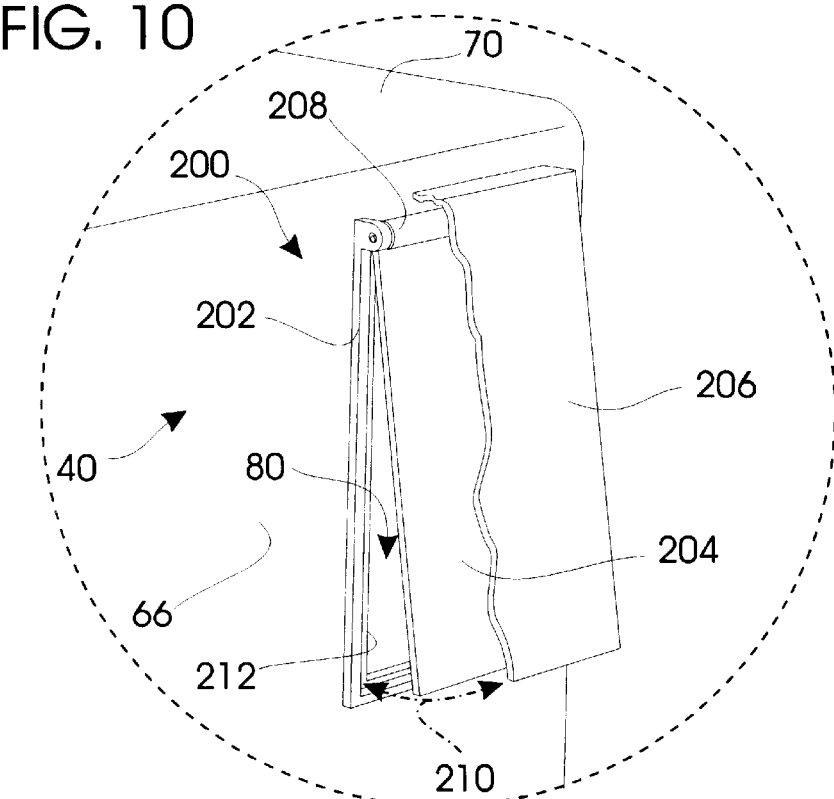
FIG. 10 is an enlarged, fragmented view similar to FIG. 8 but showing the ventilation flap in a moved position.

An automated ventilation system 200 aerates litter box compartment 90 (FIGS. 8–10). Ventilation system 200 comprises an orifice 202 penetrating rear wall 66. Orifice 202 is covered by an inner flap 204 and an outer, exterior shield 206. A spring 208 biases flap 204 in a closed position (FIG. 9). When a pressure differential develops between the house 32 and the exterior, inner flap 204 may move outwardly as indicated by arrow 210. However, inner lip 212 circumscribing orifice 202 prevents flap 204 from moving inwardly into the housing interior 80.

VENTILATION

Litter box 20 automatically ventilates whenever a door in house 32 shuts. As indicated by arrow 250 in FIGS. 5–7, air inside house 32 flows outwardly in response to pressure increases. The increased pressure causes the air to flow through housing 40, especially litter box compartment 90 and orifice 202.

Whenever the door is shut, the air pressure inside house 32 is increased correspondingly. This pressure differential is generally released through holes, cracks, etc., already in the house. However, the automatically ventilated litter box 20 employs this pressure differential to automatically ventilate litter box compartment 90.

As the air flows outwardly, it also flows through housing 40. Although housing 40 is designed to be an insignificant heating and cooling loss portal, an outflow of air does occur through orifice 202. To dissipate the pressure differential, flap 204 opens outwardly as indicated by arrow 210 (FIG. 10). As soon as the pressure differential has subsided, flap 204 returns to its biased, closed position (FIG. 9). Lip 212 prevents flap 202 from entering the housing interior 80. Preferably, a tensioning spring 210 maintains slight pressure on flap 204 to keep it closed.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A window-mounted litter system for cats, said system comprising: a housing generally in the form of a parallelepiped adapted to be inserted within a window opening and restrained by a window against the sill;

an internal partition dividing said housing into a litter box compartment and an adjoining entrance foyer, said foyer providing a passageway into said housing and said compartment;

access means for servicing said litter box compartment;

a litter box adapted to be removably disposed within said compartment;

litter capture means for recovering debris from the paws of a cat either leaving or entering the compartment, said litter capture means removably mounted beneath said foyer and providing a separate reservoir for capturing said paw debris;

wherein said litter capture means comprises a storage tray covered by a perforated top, said perforated top prying litter from the bottom of a cat's paws as it walks across said top;

curtain means for shrouding said housing; and, door means for automatically venting odors from said litter box externally of said housing in response to pressure changes, said door means comprising a ventilation orifice, a one-way flap normally covering said orifice, said flap adapted to open outwardly in response to pressure increases, and means for preventing said flap from opening inwardly, wherein said means for preventing said flap from opening inwardly comprises a recessed lip circumscribing the interior of said orifice; and, wherein said door means further comprises cover means for preventing the entry of debris through said flap.

2. The system as defined in claim 1 wherein said internal partition further comprises grooming means for removing loose hair from a cat as it passes between said foyer and said compartment.

3. The system as defined in claim 2 wherein said foyer further comprises distraction means for increasing a cat's residence time in said foyer.

4. A litter box for cats, said litter box comprising:

a resilient, generally cubicle housing in the form of a parallelepiped for occupying a window opening of a dwelling said cubicle restrained by a window against the sill for stability within the window opening;

an interior defined by said housing;

a partition dividing said interior into a separate litter box compartment and an adjacent separate entrance foyer;

a passageway into said housing defined by said entrance foyer;

litter capture means for recovering debris from the paws of a cat either leaving or entering the foyer, said litter capture means removably mounted within said foyer and comprising a perforated storage tray slidably, removably coupled to the front of said housing for prying litter from the bottom of a cat's paws;

said partition comprising an access port providing a cat ingress or egress to said litter box compartment from within the housing;

a litter box access door coupled to the housing for opening or closing the litter box compartment for removing or inserting a litter box from the front of the housing;

a grooming disk secured to said access port for brushing a cat as it passes through said access port, said grooming disk comprising a resilient frame and a plurality of radially spaced apart inwardly projecting fingers for contacting a cat traversing the access port.

5. The housing as defined in claim 4 wherein said grooming disk is removably snap fitted to said partition within said port.

6. The housing as defined in claim 4 wherein said foyer further comprises distraction means for increasing said cat's residence time in said foyer.

7. A window-mounted litter system for cats, said system comprising:

a housing generally in the form of a parallelepiped adapted to be inserted within a window opening and restrained by a window against the sill;

an entrance foyer, said foyer providing a passageway into said housing;

a separate litter box compartment adjacent said foyer;

an internal partition for dividing said housing into a separate foyer and a separate compartment disposed between said compartment and said foyer;

access means for servicing said litter box compartment;

a litter box adapted to be removably disposed within said compartment;

litter capture means for recovering debris from the paws of a cat either leaving or entering the compartment, said litter capture means slidably, removably mounted to said housing within said foyer and comprising a separate storage tray with a removable perforated top for capturing said paw debris;

said partition comprising an access port through which a cat may enter said litter box compartment; and, a grooming disk secured to said access port and comprising a plurality of inwardly projecting pie shaped fingers for cleaning a cat as it passes through said access port, said grooming disk removably fitted to said partition within said port.

8. The housing as defined in claim 7 wherein said said storage tray comprises a recessed ledge circumscribing a tray storage area over which the removable top is normally positioned.

9. The housing as defined in claim 8 wherein said foyer further comprises distraction means for increasing said cat's residence time in said foyer.

10. The system as defined in claim 7 of further comprising means for automatically venting odors from said litter box externally of said housing in response to pressure changes, said last mentioned means comprising:

a ventilation orifice defined in said litter compartment;

a one-way flap adapted to open outwardly in response to pressure increases, said flap normally biased in a closed position; and, means for preventing said flap from opening inwardly into said interior, said means for preventing said flap from opening inwardly comprising a recessed lip circumscribing the interior of said orifice.

* * * * *